US008611878B2

(12) United States Patent
Fersman et al.

(10) Patent No.: US 8,611,878 B2
(45) Date of Patent: Dec. 17, 2013

(54) ARRANGEMENT AND METHOD FOR CONTROLLING SERVICE ACTIVATION ON A MOBILE TERMINAL

(75) Inventors: Elena Fersman, Uppsala (SE); Michael Åström, Rönninge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/367,505

(22) Filed: Feb. 7, 2012

(65) Prior Publication Data

US 2012/0196584 A1 Aug. 2, 2012

Related U.S. Application Data

(62) Division of application No. 12/305,304, filed as application No. PCT/IB2006/001659 on Jun. 20, 2006, now Pat. No. 8,150,383.

(51) Int. Cl.
*H04M 3/42* (2006.01)
*H04L 12/16* (2006.01)
*H04Q 11/00* (2006.01)

(52) U.S. Cl.
USPC ........... 455/416; 370/260; 370/261; 370/265; 370/270

(58) Field of Classification Search
USPC .................................................. 455/415–420
See application file for complete search history.

(56) References Cited

U.S. PATENT DOCUMENTS

| 2004/0023646 | A1  | 2/2004  | Inami et al. |
| 2005/0223352 | A1  | 10/2005 | Nishida |
| 2006/0079260 | A1* | 4/2006  | Tillet et al. ..................... 455/518 |
| 2006/0276213 | A1* | 12/2006 | Gottschalk et al. ........... 455/518 |

FOREIGN PATENT DOCUMENTS

WO    WO 99/43164 A1    8/1999

OTHER PUBLICATIONS

Johnston, A., and O. Levin, "Session Initiation Protocol Call Control—Conferencing for User Agents," Internet Engineering Task Force (IETF) Standard—Working Draft, Jun. 3, 2005.*
Rosenberg, J. et al., "Indicating User Agent Capabilities in the Session Initiation Protocol (SIP)," Internet Engineering Task Force (IETF) Standard—Working Draft, Aug. 2004.*
Levin, O., and A. Johnston, "Conveying Feature Tags with Session Initiation Protocol REFER Method draft-ietf-sip-refer-feature-param-01," IETF Standard—Working Draft, Jan. 13, 2006.*

* cited by examiner

*Primary Examiner* — Marisol Figueroa
*Assistant Examiner* — Erica Navar

(57) ABSTRACT

An arrangement and method in a wireless communication network provides users with full control of service management, defines how a user can enter or leave services, and defines dependencies between services. A mobile terminal initiates establishment of a group and creates a unique groupID. The terminal sends invitations to other terminals to join the group and includes the unique groupID and a service feature tag for a desired service. The terminal will not request a service if it is incompatible with a service already running. Terminals that receive invitations store the groupID and service feature tags. These parameters are used to send acceptances or rejections, and to join later or leave a service.

9 Claims, 8 Drawing Sheets

ARRANGEMENT AND METHOD FOR CONTROLLING SERVICE ACTIVATION ON A MOBILE TERMINAL

RELATED APPLICATIONS

This application is a divisional of U.S. patent application Ser. No. 12/305,304 filed Feb. 16, 2009, now U.S. Pat. No. 8,150,383, which is a 371 of International Application No. PCT/IB2006/001659, filed Jun. 20, 2006, the disclosures of which are fully incorporated herein by reference.

TECHNICAL FIELD

This invention relates to mobile communication systems. More particularly, and not by way of limitation, the invention is directed to an arrangement and method for controlling activation and deactivation of services on a mobile terminal.

BACKGROUND

Group communication services are becoming increasingly popular. Many services providing group communications such as Microsoft Network (MSN), Skype, or Yahoo have traditionally operated only with personal computers, but are now moving to mobile devices. To date, there have been activities regarding service manipulation on the network side (for example, service composition and SIP servlets), but little or no activity on the terminal side. The network solutions do not give the user full control of service management. No rules exist that define how a subscriber can enter or leave services, and there are no rules defining dependencies between services.

What is needed in the art is an arrangement and method for manipulating services that overcomes the shortcomings of the prior art. The present invention provides such an arrangement and method.

SUMMARY

The present invention provides an arrangement and method that provides users with full control of service management, defines how a user can enter or leave services, and defines dependencies between services.

Thus in one aspect, the present invention is directed to a method of activating a desired service on a mobile terminal participating in a first group. The method includes determining whether activation of the desired service on the mobile terminal would conflict with a service running on other mobile terminals in the group. If activation of the desired service on the mobile terminal would conflict with the running service, the method determines whether the running service can be stopped. If the running service cannot be stopped, the method sends a notification to the mobile terminal that the desired service cannot be activated. If the other service can be stopped, the method stops the other service and activates the desired service on the mobile terminal.

In another aspect, the present invention is directed to a method of activating a desired service on a mobile terminal participating in a first group. The method includes determining whether the desired service is a service that cannot be activated in more than one group at a time. If so, the method determines whether the desired service is running in a second group. If so, the method stops the desired service in the second group. The method also determines whether a second service is running in the first group that is incompatible with the desired service. If so, the method sends a notification to the mobile terminal that the desired service cannot be activated. If there is not a second service running in the first group that is incompatible with the desired service, the method activates the desired service on the mobile terminal.

In another aspect, the present invention is directed to a method of deactivating a service on a mobile terminal participating in a group. The method includes determining whether the service is a one-to-many service. If not, the mobile terminal leaves the service. If the service is a one-to-many service, the method determines whether the mobile terminal started the service. If so, the method stops the service. If the mobile terminal did not start the service, the mobile terminal leaves the service while other members of the group continue to run the service.

In another aspect, the present invention is directed to a method in a wireless communication network for establishing a user group that comprises a plurality of mobile terminals, and running a conference service. The method includes the steps of initiating the conference service by a first mobile terminal; setting up by the network, an empty conference with the first mobile terminal; inviting by the first mobile terminal, a second mobile terminal in the network to join the conference; and joining the conference by the second mobile terminal. This is followed by notifying the first mobile terminal that the second mobile terminal has joined the conference; and notifying the second mobile terminal that the conference includes the first mobile terminal and the second mobile terminal.

In another aspect, the present invention is directed to an arrangement in a wireless communication network for providing users with control of service management. The arrangement includes means for enabling a first user to establish a group; means for enabling the first user to invite a plurality of other users defined by the first user to join the group; and means for enabling a user to start a service within the group. The service starting means ensures that the service does not conflict with any other services already running within the group or in other groups. The arrangement also includes means for enabling the first user to invite a plurality of other users defined by the first user to subscribe to the service.

In another aspect, the present invention is directed to a mobile terminal for providing a user with control of service management in a wireless communication network. The mobile terminal includes means for initiating establishment of a group of mobile terminals; means for creating a unique group identifier for the group; and means for sending invitations to other mobile terminals to join the group. The invitations include the unique group identifier and a service feature tag. The mobile terminal also includes means for storing unique group identifiers and service feature tags received in invitations from other mobile terminals; and means for sending acceptances to invitations to join other groups received from other mobile terminals. Through use of the mobile terminal, the user may join and leave an ongoing service any time after being invited to join. Even if the invitation was initially rejected, the user may join later.

BRIEF DESCRIPTION OF THE DRAWINGS

In the following section, the invention will be described with reference to exemplary embodiments illustrated in the figures, in which.

DETAILED DESCRIPTION

Figure 1:
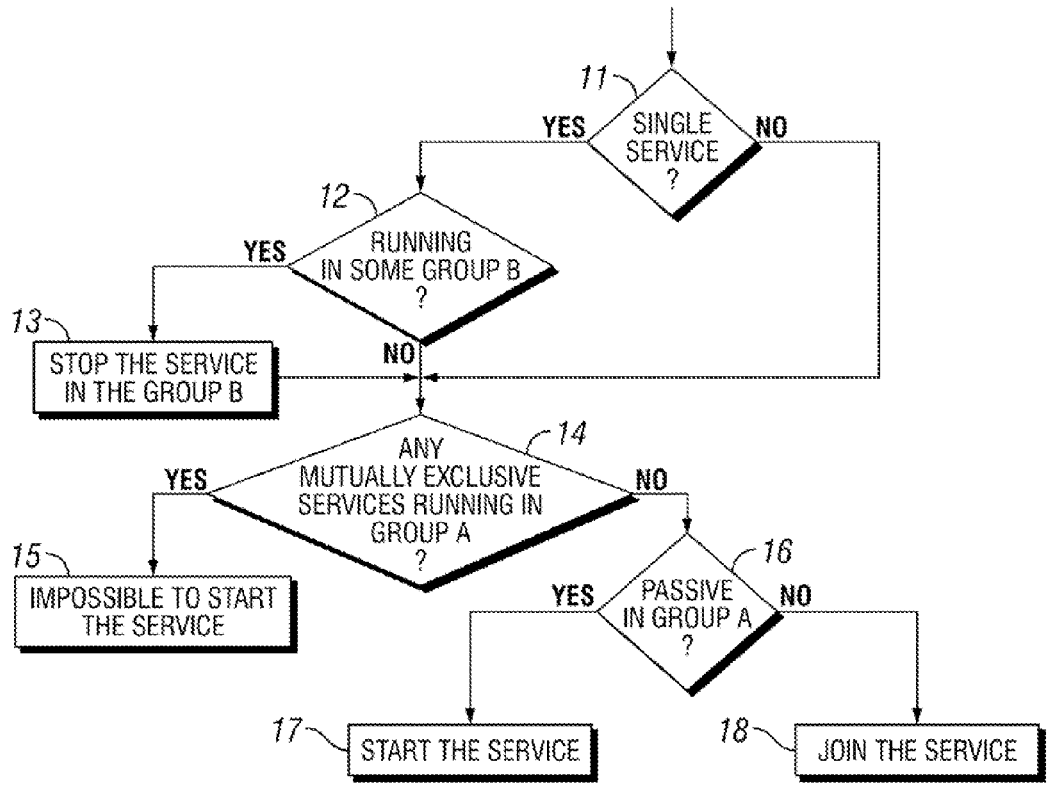
FIG. 1 is a flow chart illustrating the steps of an exemplary procedure for service activation in Group A.

In this description, the 3GPP IMS architecture and the IETF protocol SIP is used as a foundation for the application. The invention is however not restricted to using 3GPP IMS and SIP.

In the present invention, mobile terminals maintain a matrix-based representation of services and subscriber groups for the mobile terminal, together with defined procedures for activation and deactivation of the services. An example of such a representation is shown below in Table 1. Columns in the table show the subscriber groups currently running in the terminal, and rows show the services supported by the terminal (i.e., capabilities). Symbols in the table have the following meanings:

M—the service is active in the group and I am a participant.

G—the service is active in the group but I am not a participant.

X—the service is active in the group but my subscription does not allow me to use it.

TABLE 1

Service mapping example

| Service | Group A | Group B | Group C |
|---|---|---|---|
| Text chat | M | M | M |
| Voice chat | G | M | |
| Live video | M | | |
| Video share | | | |
| Live TV | | | |
| Gaming | | | M |
| Whiteboard | | X | |

Different types of services and interactions between them are defined from the terminal perspective. Using the table representation, it can be readily determined which services are currently running in each group, and whether the running services are consistent. The mechanisms for dealing with different types of services are common for all services, and thus the description does not refer to any specific service but to a generic one referred as "Service1".

The following definitions of different types of services are utilized herein:

Default service—a service that starts upon group creation and is destroyed when the group is closed. An example of such service is text chat.

User-active service—a service currently running and utilized by the user. Such services are marked by M in Table 1.

Group-active service—a service currently running by the group but not by the user. Such services are marked by G in Table 1.

Single service—a service that cannot be user-active in more than one group at a time. An example of such service is voice chat.

Mutually exclusive services—services that are not allowed to be group-active in the same group. Examples of such services are live video and whiteboard.

One-to-many service—a service where its creator is in control of the media stream and other participants are the receivers of the media. Examples of such services are live video and video share.

Unsubscribed service—a service that is not allowed to run since the user subscription does not cover it. X in Table 1 marks such services.

Unsupported service—a service that cannot run due to limitations of the user terminal.

In the following sections, procedures are defined for activating and deactivating services. A user is only in control of services running on his terminal, and can create, join, leave, or stop such services. It is assumed that the target terminal has at least one group communication running, which implies that the user runs at least the default service in each of the created groups.

FIG. 1 is a flow chart illustrating the steps of an exemplary procedure performed by a mobile terminal for service activation in Group A. There are four conditional statements involved in service activation, which check the service nature and determine whether the service is in conflict with services running in the same group or on the same terminal. The last conditional statement in the diagram decides if the service will be started (i.e. it was not running in Group A) or joined.

At step 11, it is determined whether the service is a single service, that is, a service that cannot be user-active in more than one group at a time. If not, the process moves to step 14. If the service is a single service, the process moves to step 12 where it is determined whether the service is running in some other group such as Group B. If not, the process moves to step 14. If the service is running, for example in Group B, the process moves to step 13 where the service is stopped in Group B.

At step 14, it is determined whether there are any mutually exclusive services running in Group A. If so, the process moves to step 15 where it is concluded that the new service cannot be started. If there are not any mutually exclusive services running in Group A, the process moves to step 16 where it is determined whether the service is passive in Group A. If so, the process moves to step 17 where the service is started. If the service is not passive in Group A, the process moves to step 18 where the user joins the service.

Figure 2:
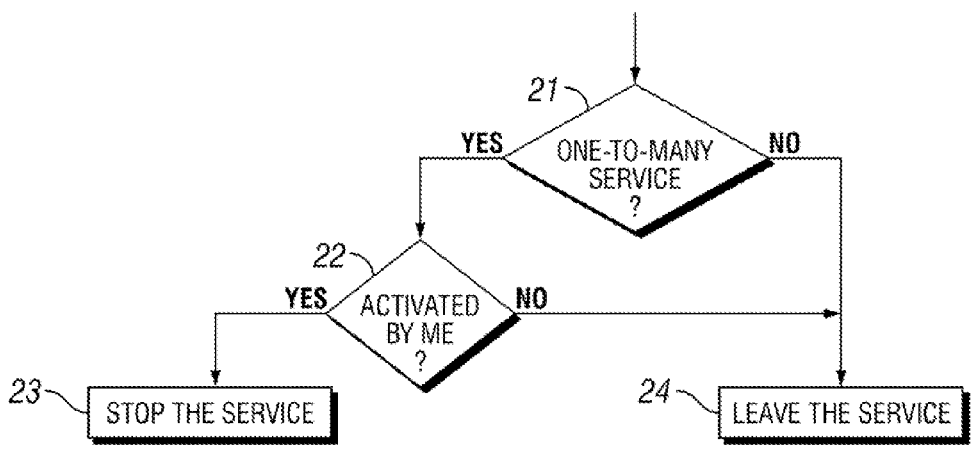
FIG. 2 is a flow chart illustrating the steps of an exemplary procedure for service deactivation.

FIG. 2 is a flow chart illustrating the steps of an exemplary procedure performed by a mobile terminal for service deactivation. When a user leaves a service, it is important to know whether the service is a one-to-many service and whether the person leaving the service is the one who started it. In this case the service (for example live video) will be deactivated for all group participants. If the user did not start the service, the user can leave the service and the rest of the group can continue running it.

At step 21, it is determined whether the service is a one-to-many service, that is, a service where its creator is in control of the media stream and other participants are the receivers of the media. If not, the user leaves the service at step 24. If the service is a one-to-many service, the process moves to step 22 where it is determined whether the user attempting to leave the service is the user who activated the service. If not, the user leaves the service at step 24. If the user attempting to leave the service is the user who activated the service, the process moves to step 23 where the service is deactivated for all of the users.

An important principle of this invention is the manner in which services within groups are addressed. To facilitate joining or leaving a service within a group at any time, the invention utilizes a mechanism with double addressing. It is a useful feature allowing, for example, joining and leaving a voice conversation at any time. Each service that is active in a group is addressed using two parameters:
 a) Service feature tag (FT); and
 b) Unique group ID.

Together, these two parameters provide a unique address that can be used for joining a given service within a given group. Upon receiving an Invite message, the two parameters are stored in the user terminal. This kind of addressing also enables an entire group to be closed at once by using the unique group ID. By using the service feature tag instead, a specific service may be left (or stopped) in any group.

At any time, any group member can add group participants to a group. The following sections describe the procedures for activating and deactivating services, creating groups, joining services in a group, and leaving services in a group.

Figure 3A:
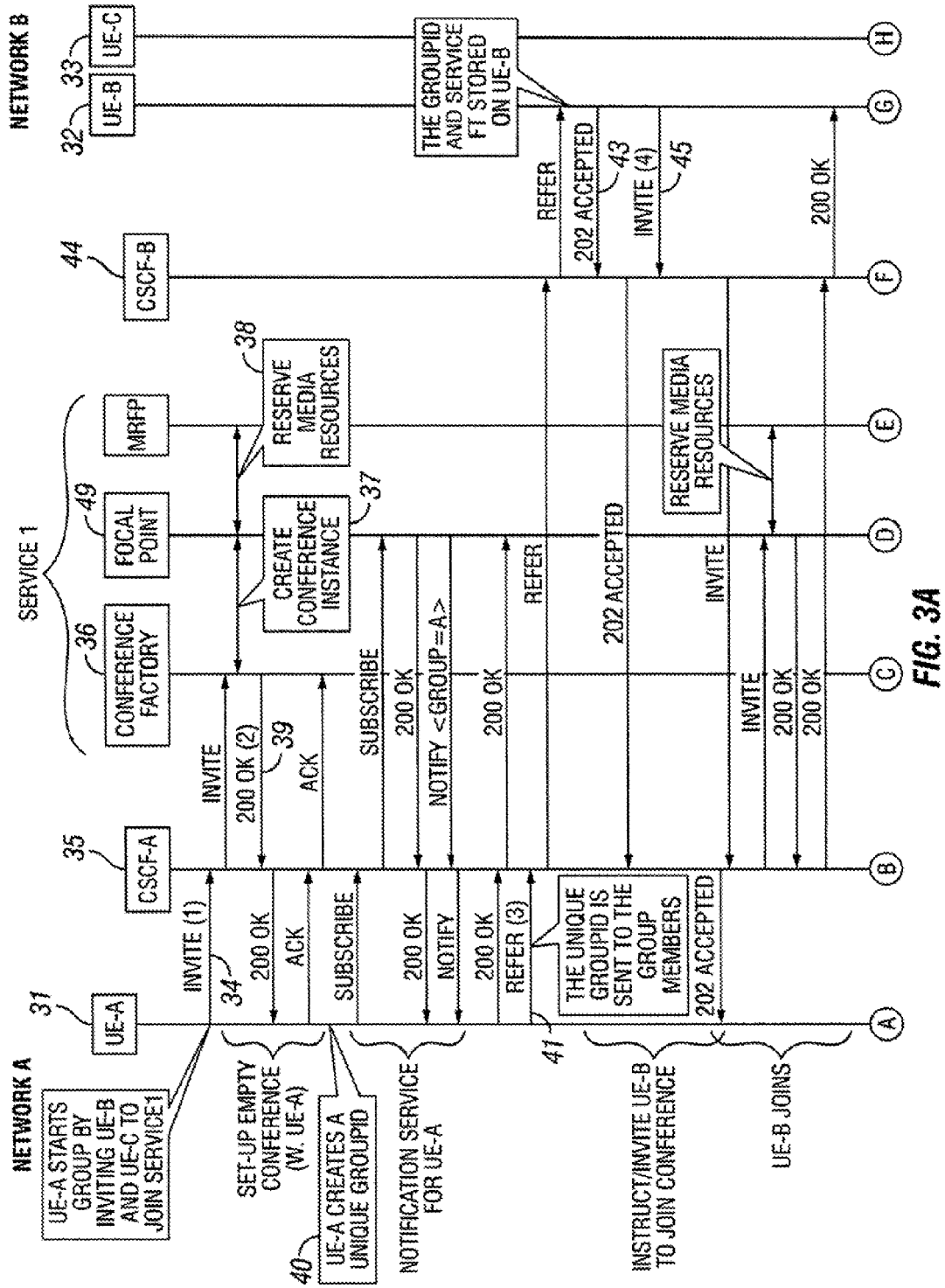
FIGS. 3A-3B are portions of a signaling diagram illustrating the flow of messages in an exemplary procedure for starting a group.
Figure 3B:
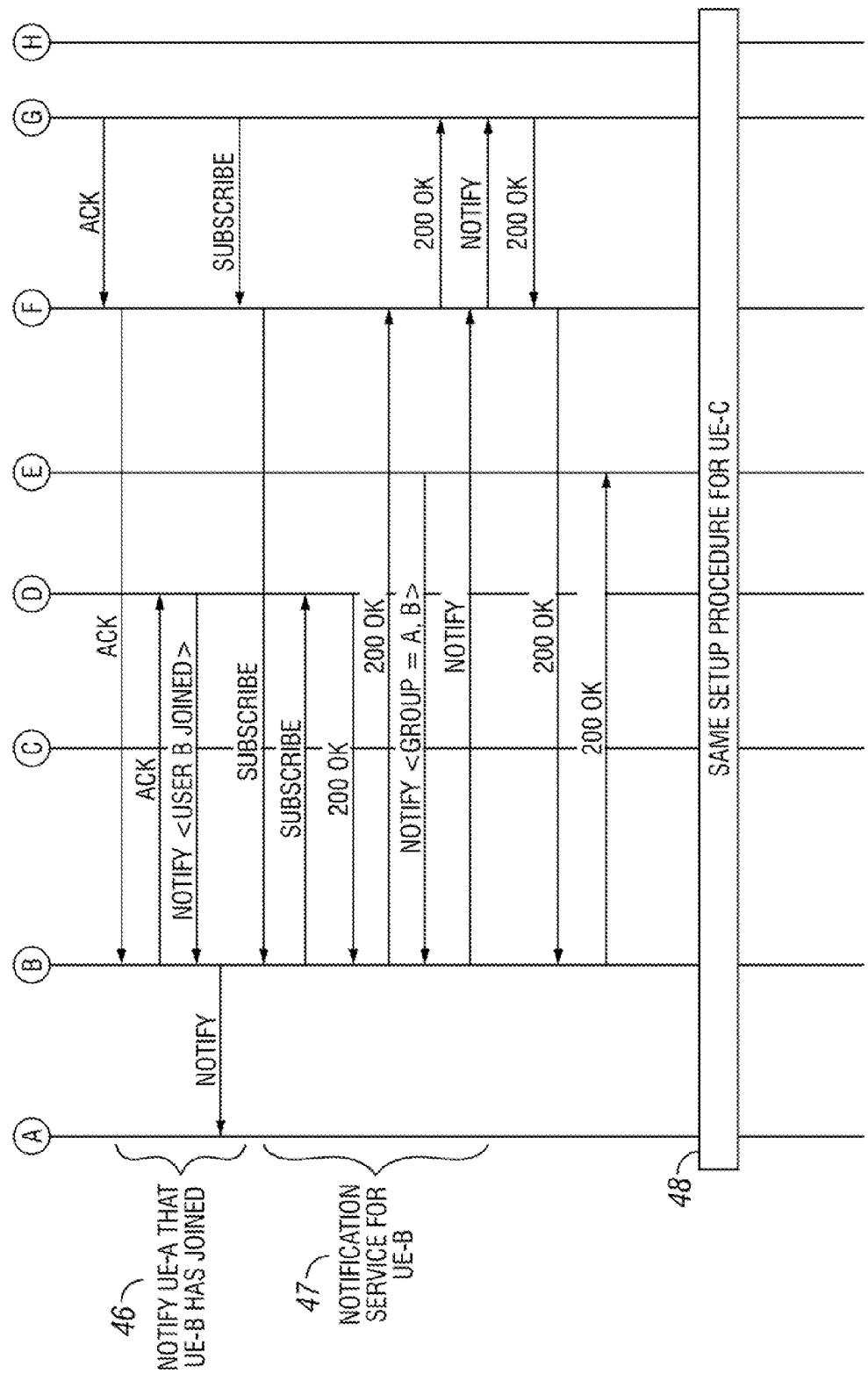

FIGS. 3A-3B are portions of a signaling diagram illustrating the flow of messages in an exemplary procedure for starting a group. In this example, a user utilizing User Equipment-A (UE-A) 31 starts a group by inviting UE-B 32 and UE-C 33 to join a default service, Service-1. FIGS. 3A-3B illustrate the setup for UE-B, and thereafter, the setup for UE-C is the same. Referring to FIG. 3A, before sending the initial INVITE message 34, the user UE-A determines whether the service can be started on its terminal according to the procedures described in the previous section. The initial INVITE message, labeled INVITE (1), has the following arguments:
 To: sip:service1-factory@domanA.org
 Accept-contact: "Service1"

The INVITE message passes through Call State Control Function (CSCF-A) 35 to a Conference Factory 36 for Service1. The Conference Factory creates a conference instance at step 37 and reserves media resources at step 38. The Conference Factory then sends a SIP 200 OK message 39 through the CSCF-A to UE-A 31. The 200 OK message, labeled 200 OK (2), has the following format:
 To: sip:b@domainB.org
 From: service1-factory@domainA.org
 Contact: sip:conf77@service1-factory.domainA.org At step 40, the UE-A 31 creates a unique group ID in response, which is sent to all group participants via a REFER message 41. The REFER message sent to UE-B, labeled REFER (3), has the following format:
 To: sip:b@omainB.org
 From: a@domainA.org
 Contact: a@domainA.org
 Refer-To: conf77@service1-factory.domainA.org; is Focus; method=INVITE
 Referred-by: sip: a@domainA.org
 Subject: GR345

After receiving the REFER message 41, UE-B stores the service feature tag (FT) (conf77@service1-factory.domainA.org) and the unique groupID (GR345) at step 42. Users may utilize these identifiers later to join the service in the group. UE-B then sends a 202 Accepted message 43 to CSCF-B 44, accepting the REFER message. UE-B then sends an INVITE message 45 through CSCF-B and CSCF-A to a Focal Point 49 associated with Service-1. The INVITE message, labeled INVITE (4) has the following format:
 To: sip:conf77@service1-factory.domainA.org
 From: sip: b@domainB.org
 Referred-by: sip:a@domainA.org Referring to FIG. 3B, at step 46, UE-A is notified that UE-B has joined. At step 47, the notification service is performed for UE-B. The process is then repeated at step 48 for UE-C.

Figure 4:
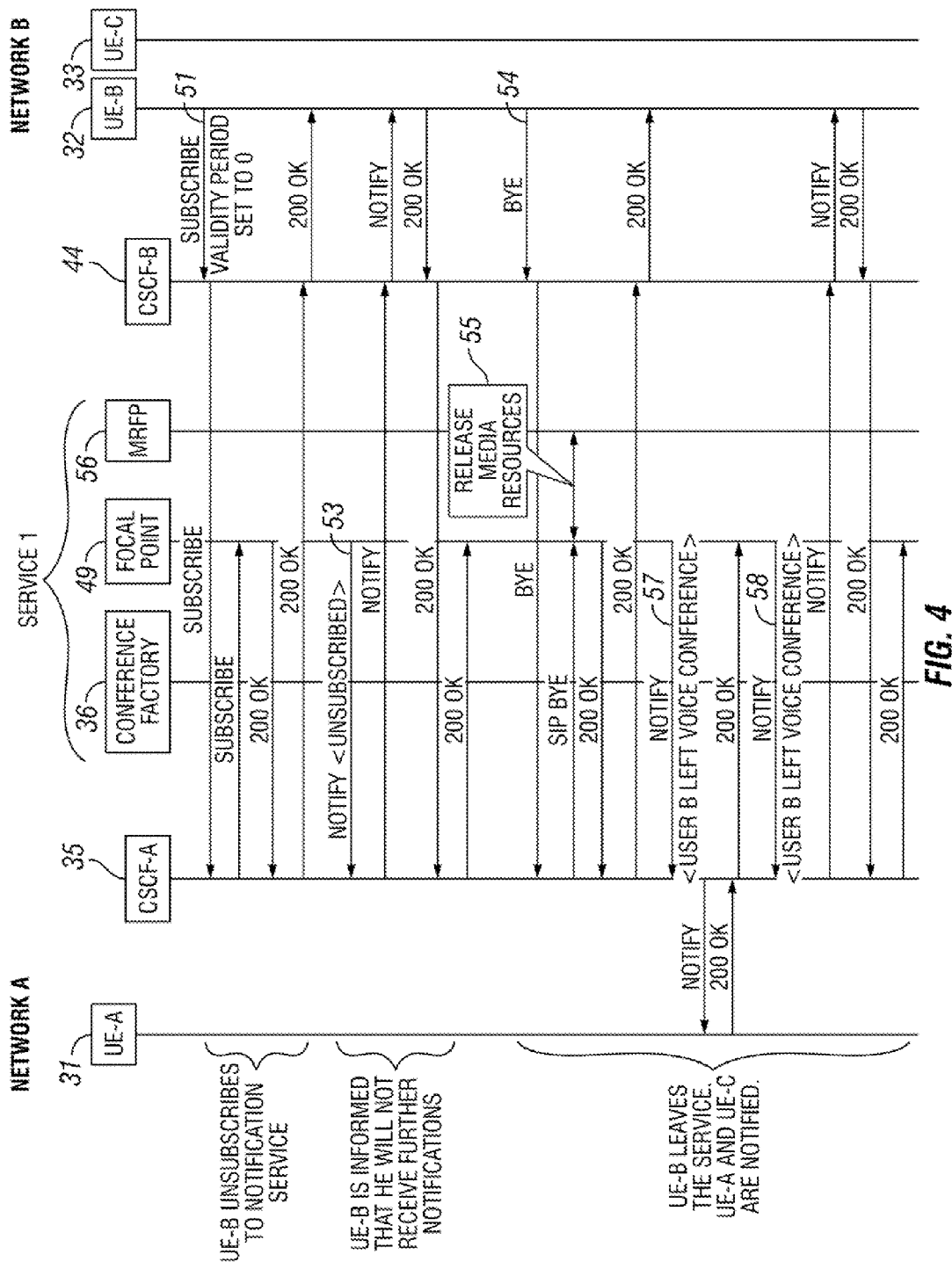
FIG. 4 is a signaling diagram illustrating the flow of messages in an exemplary procedure for leaving a group.

FIG. 4 is a signaling diagram illustrating the flow of messages in an exemplary procedure for leaving a group. In this example, UE-B 32 leaves the group consisting of UE-A 31, UE-B 32, and UE-C 33. The process starts when UE-B sends a Subscribe message 51 through CSCF-B 44 and CSCF-A 35 to a Focal Point 49. A validity period in the Subscribe message is set to zero (0). The Focal Point then sends a Notify message 53 back to UE-B by the same route. The Notify message indicates that UE-B is unsubscribed, i.e., will not receive any further notifications about group events. UE-B then sends a BYE message 54 to the Focal Point. At step 55, the Focal Point works with a Multimedia Resource Function Processor (MRFP) 56 to release network resources associated with UE-B. At step 57, the Focal Point notifies UE-A that UE-B has left, and at step 58, the Focal Point notifies UE-C that UE-B has left. The Focal Point may retain the address for UE-B so that the Focal Point may optionally send a notification to UE-B at a later time if the group/service is deactivated, and is no longer available to be joined.

Figure 5:
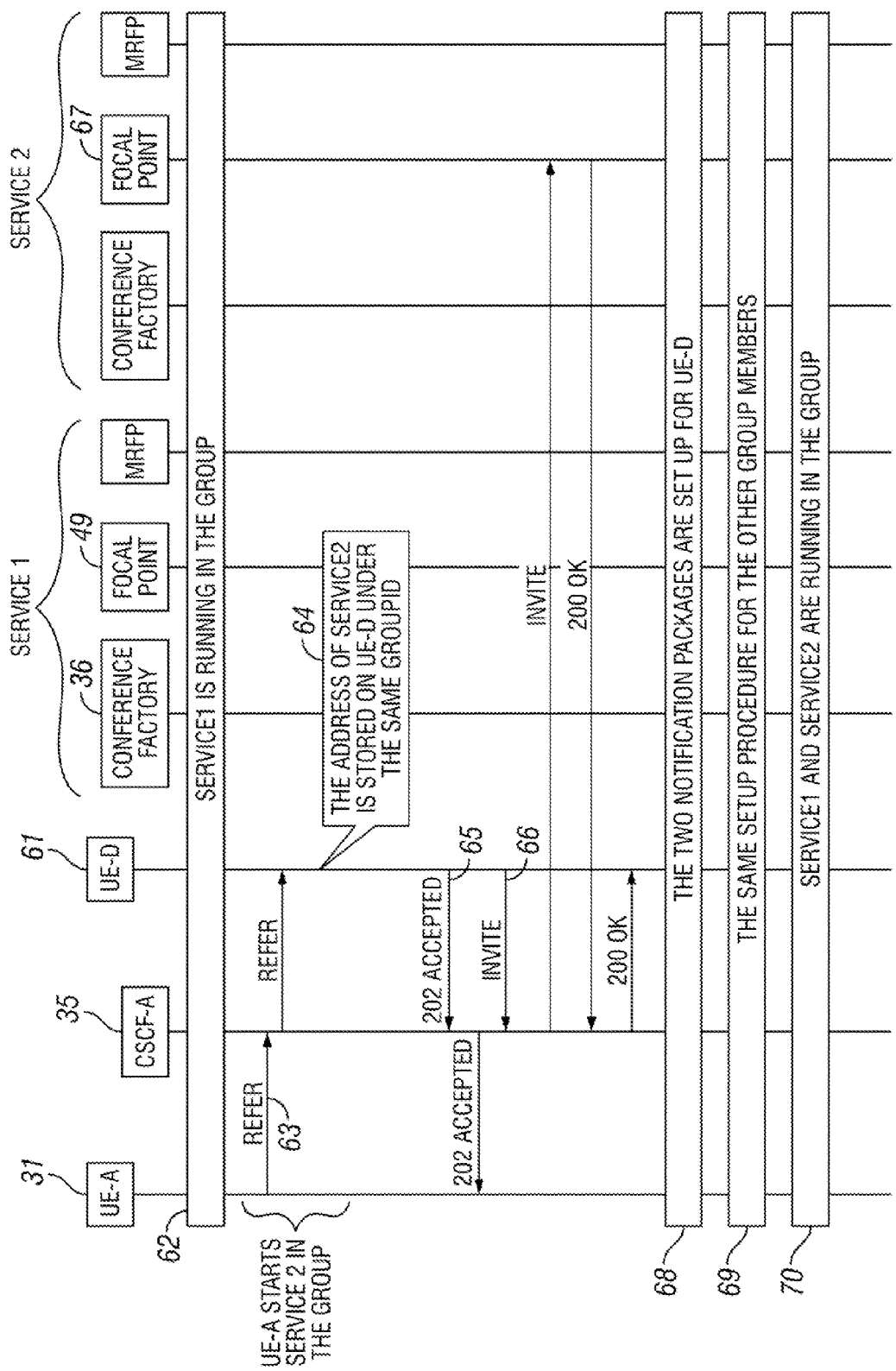
FIG. 5 is a signaling diagram illustrating the flow of messages in an exemplary procedure for adding a new service to a group that currently is running a service.

FIG. 5 is a signaling diagram illustrating the flow of messages in an exemplary procedure for adding a new service (Service-2) to a group that currently is running a service (Service-1). In this example, UE-A 31 is adding Service-2 and inviting UE-D 61 to join. At step 62, it is noted that the precondition for this procedure is that Service-1 (e.g. text chat) is running in the group.

UE-A 31 starts the process by sending a REFER message 63 to the group. For simplicity, only the REFER message to UE-D 61 is shown. Note that before sending this message, a consistency check is performed to determine whether Service-2 is in conflict with Service-1 running in the same group or on the same terminal. The REFER message has the following format:
 To: sip:d@domainD.org
 From: a@domainA.org
 Contact: a@domainA.org
 Refer-To: conf77@service2-factory.domainA.org; is Focus; method=INVITE
 Referred-by: sip: a@domainA.org
 Subject: GR345

After receiving the REFER message 63, UE-D stores the service address (conf77@service2-factory.domainA.org) and the unique groupID (GR345) at step 64. UE-D then sends a 202 Accepted message 65 through CSCF-A 35 to UE-A, accepting the REFER message. UE-D then sends an INVITE message 66 through CSCF-A to a Focal Point 67 associated with Service-2. The INVITE message has the following format:
 To: sip:conf77@service2-factory.domainA.org
 From: sip: d@domainD.org
 Referred-by: sip:a@domainA.org At step 68, UE-A is notified that UE-D has joined, and UE-D is notified that it has joined the group for Service-2. At step 69, the setup process is then repeated for the other group members. At step 70, Service-1 and Service-2 are both running in the group.

Figure 6:
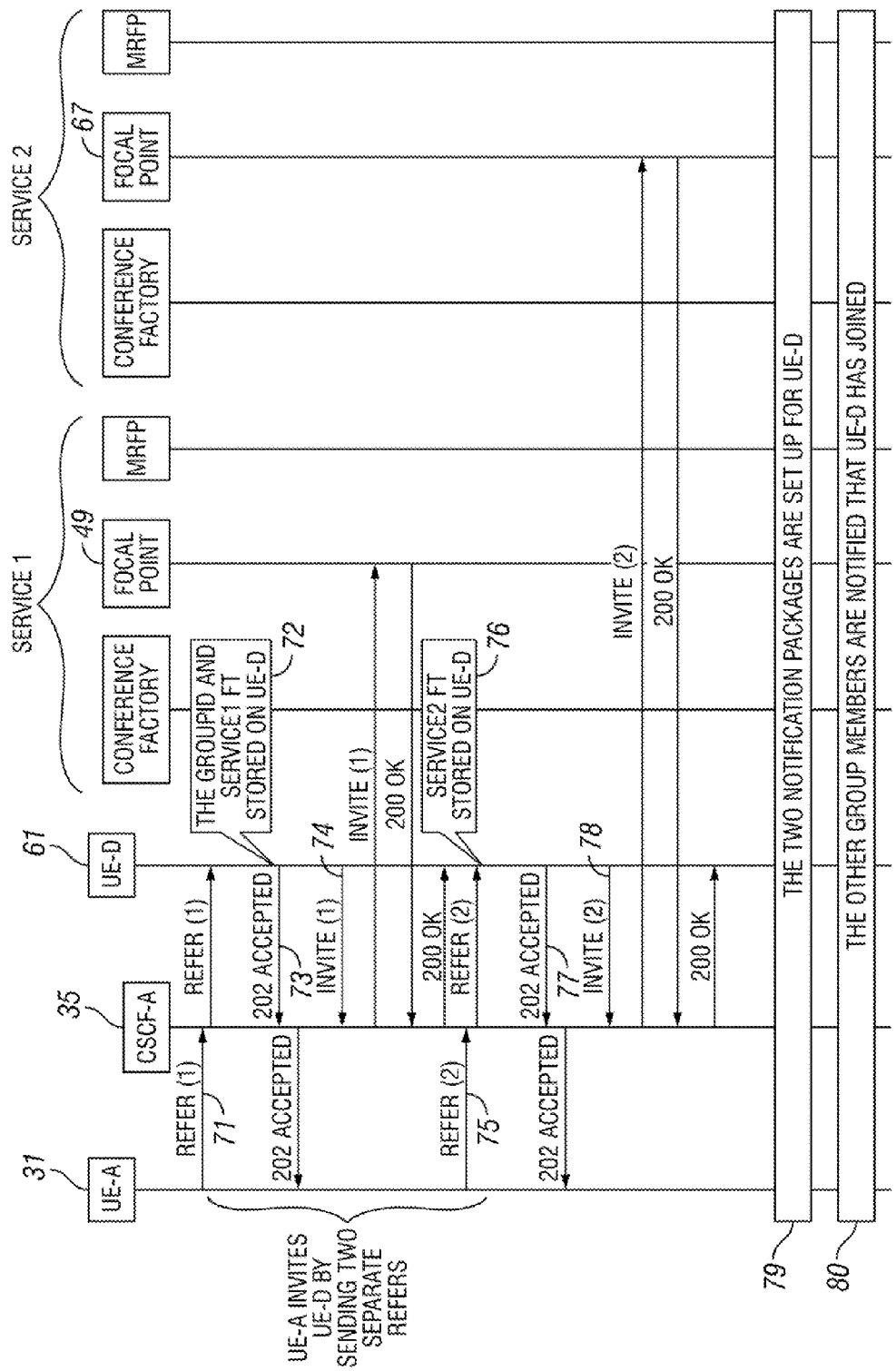
FIG. 6 is a signaling diagram illustrating the flow of messages in an exemplary procedure for inviting a new participant to join an existing group.

FIG. 6 is a signaling diagram illustrating the flow of messages in an exemplary procedure for inviting a new participant to join an existing group. In this example, UE-A 31 is inviting UE-D 61 to join. The group runs two different services, and the UE-D receives a REFER for each service separately and can choose to accept or reject each service. In any case, the service address is stored on the terminal of the invited participant.

UE-A 31 starts the process by sending a first REFER message 71 to UE-D 61. The REFER (1) message invites UE-D to join the group to participate in Service-1. After receiving the REFER (1) message, UE-D stores the service FT (conf77@service1-factory.domainA.org) and the unique groupID (GR345) at step 72. UE-D then sends a 202 Accepted message 73 through CSCF-A 35 to UE-A, accepting the REFER (1) message. UE-D then sends an INVITE message 74 through CSCF-A to the Focal Point 49 associated with Service-1.

UE-A 31 continues the process by sending a second REFER message 75 to UE-D 61. The REFER (2) message invites UE-D to join the group to participate in Service-2. After receiving the REFER (2) message, UE-D stores the service FT (conf77@service2-factory.domainA.org) and the unique groupID (GR345) at step 76. UE-D then sends a 202 Accepted message 77 through CSCF-A 35 to UE-A, accepting the REFER (2) message. UE-D then sends an INVITE message 78 through CSCF-A to the Focal Point 67 associated with Service-2. At step 79, UE-A is notified that UE-D has joined, and UE-D is notified that it has joined the group for Service-1 and/or Service-2. At step 80, the other group members are notified that UE-D has joined the group for Service-1 and/or Service-2.

Figure 7:
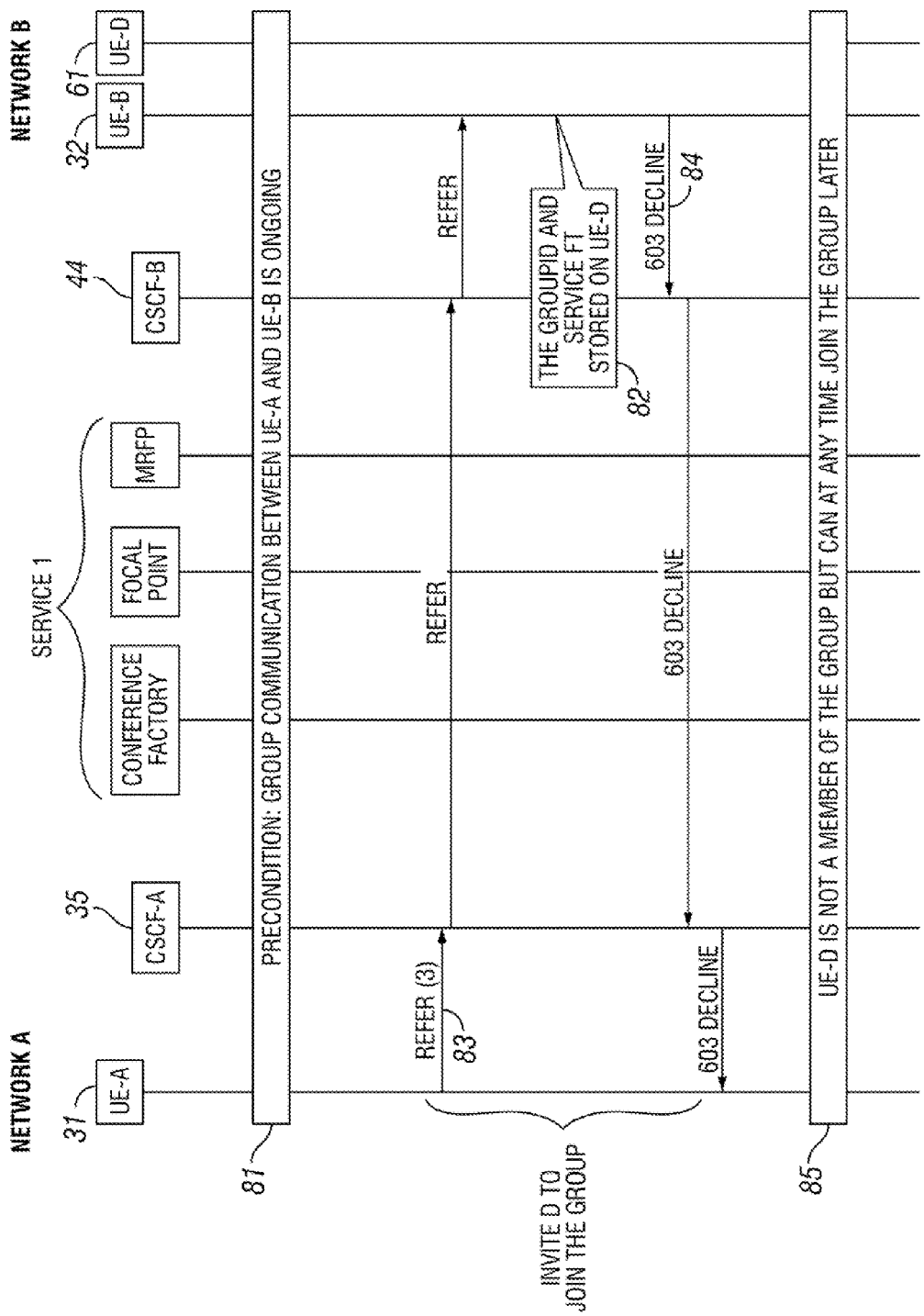
FIG. 7 is a signaling diagram illustrating the flow of messages in an exemplary procedure for rejecting an invitation to join an existing group.

FIG. 7 is a signaling diagram illustrating the flow of messages in an exemplary procedure for inviting a new participant to join an existing group, and rejecting the invitation by the invited participant. In this example, UE-A 31 is inviting UE-D 61 to join, and UE-D declines. Note that even in the case of a rejection, the group ID and the service FT are stored on the participant's terminal allowing him to join later.

At step 81, it is noted that the precondition for this procedure is that group communication between UE-A 31 and UE-B 32 is ongoing. UE-A starts the process by sending a REFER message 82 via CSCF-A 35 and CSCF-B 44 to UE-D 61. The REFER (3) message invites UE-D to join the group to participate, for example, in Service-1. After receiving the REFER (3) message, UE-D stores the service FT (conf77@service1-factory.domainA.org) and the unique groupID (GR345) at step 83. UE-D then sends a 603 Decline message 84 via CSCF-B and CSCF-A to UE-A, declining to join. It is noted at step 85 that although UE-D has declined, UE-D may join later utilizing the stored groupID and service FT.

Figure 8:
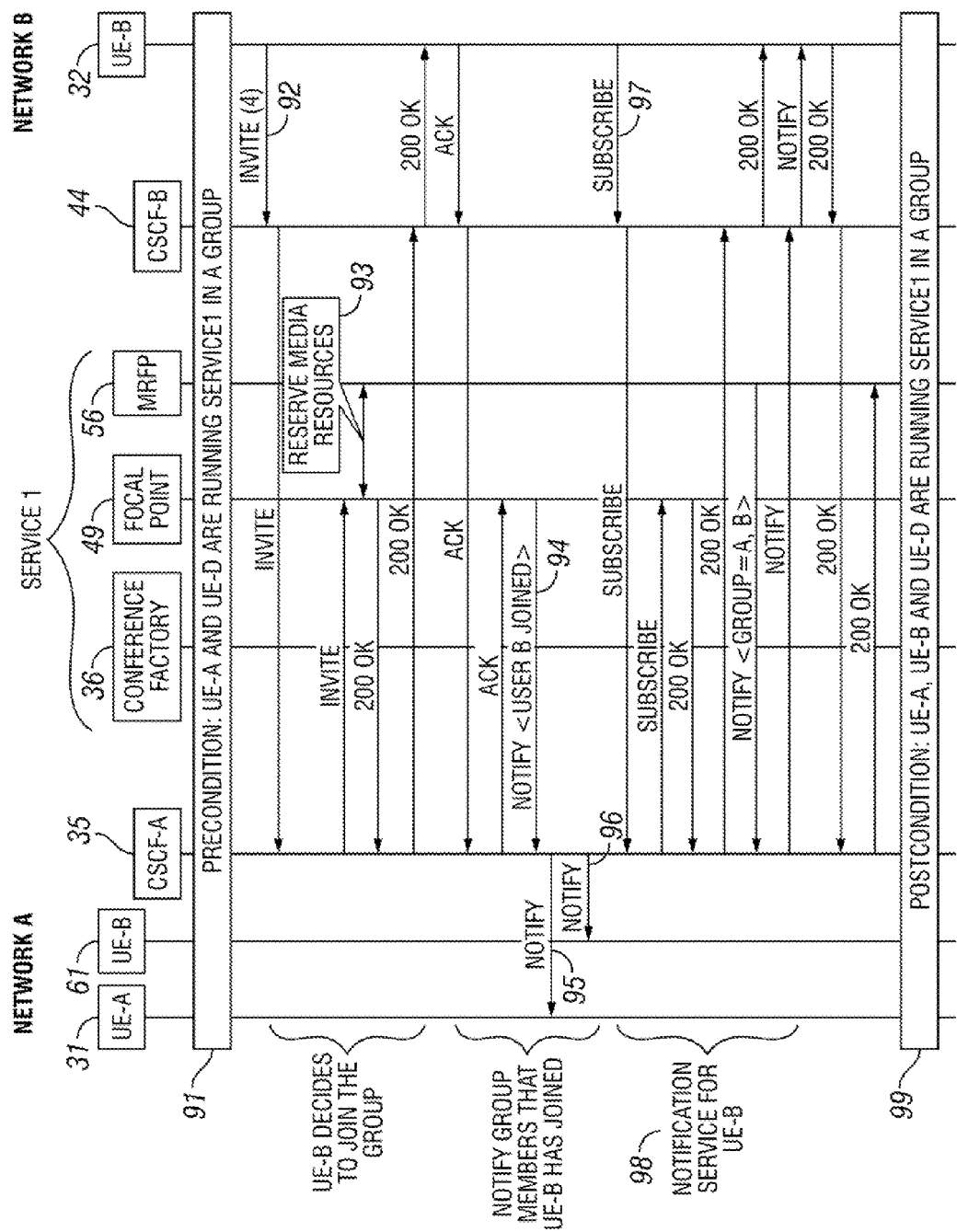
FIG. 8 is a signaling diagram illustrating the flow of messages in an exemplary procedure for a new participant to utilize a stored groupID and service FT to join an existing group.

FIG. 8 is a signaling diagram illustrating the flow of messages in an exemplary procedure for a new participant to utilize a stored groupID and service FT to join an existing group. In this example, UE-B 32 joins an existing group in which UE-A 31 and UE-D 61 are running Service-1. UE-B was previously invited to join the group, but either rejected the invitation or joined the group and then left. Now UE-B utilizes the stored groupID and the service FT currently running in the group to join the group and subscribe to Service-1.

At step 91, it is noted that the precondition for this procedure is that UE-A 31 and UE-D 61 are running Service-1 in a group. UE-B 32 starts the process by sending an INVITE message 92 via CSCF-B 44 and CSCF-A 35 to the Focal Point 49 for Service-1. The INVITE message includes the unique groupID, which UE-B previously stored when UE-B was first invited to the group. The Focal Point reserves media resources with MRPF 56 at step 93. The Focal Point then sends a Notify message 94 to CSCF-A, which sends notifications 95 and 96 to the group members UE-A and UE-D indicating that UE-B has joined the group.

Once UE-B 32 has joined the group, he can choose which services within the group he would like to participate in. Having decided to participate in Service-1, UE-B sends a Subscribe message 97 via CSCF-B 44 and CSCF-A 35 to the Focal Point 49 for Service-1. The Subscribe message includes the service FT for Service-1, which UE-B previously stored when UE-B was first invited to the group. At step 98, a notification service is conducted to notify UE-B that UE-A 31 and UE-D are running Serivce-1. At step 99, it is noted that the postcondition for this procedure is that UE-A, UE-B, and UE-D are running Service-1 in the group.

Those skilled in the art will readily appreciate that the present invention may be implemented using either hardware, or software, or both, and further, software implementations may vary using different languages and data structures.

The present invention may of course, be carried out in other specific ways than those herein set forth without departing from the essential characteristics of the invention. The present embodiments are, therefore, to be considered in all respects as illustrative and not restrictive. All changes coming within the meaning and equivalency range of the appended claims are intended to be embraced therein.

The invention claimed is:

1. A method in a wireless communication network for establishing a user group conference that comprises a plurality of mobile terminals, and running a conference service within the user group conference, said method comprising:
   initiating the conference service by a first mobile terminal by sending an Invite message from the first mobile terminal to the network, the Invite message identifying the conference service, thereby enabling the network to route the Invite message to a conference factory for the identified conference service;
   setting up by the network, an empty conference with the first mobile terminal, wherein the conference factory returns to the first mobile terminal, a service feature tag identifying the conference service and providing an address of the conference factory;
   inviting by the first mobile terminal, a second mobile terminal in the network to join the user group conference and the identified conference service, wherein the first mobile terminal sends to the second mobile terminal, a double address comprising the service feature tag and a unique group identifier for the user group conference;
   utilizing the unique group identifier by the second mobile terminal to join the user group conference, wherein the second mobile terminal sends a second invite message to a focal point associated with the identified conference service, the second invite message including the unique group identifier; and
   utilizing the stored service feature tag by the second mobile terminal to subscribe to the identified conference service;
   notifying the first mobile terminal that the second mobile terminal has joined the user group conference; and
   notifying the second mobile terminal that the user group conference includes the first mobile terminal and the second mobile terminal.

2. The method according to claim 1, wherein the step of setting up an empty conference with the first mobile terminal includes:

creating a conference instance between the conference factory and a focal point associated with the conference service in response to receiving the invite message from the first mobile terminal; and reserving media resources for the first mobile terminal.

3. The method according to claim 2, wherein the step of inviting the second mobile terminal to join the conference includes sending a refer message from the first mobile terminal to the second mobile terminal, said refer message inviting the second mobile terminal to join the conference, wherein the refer message includes the double address comprising the service feature tag and the unique group identifier.

4. The method according to claim 3, further comprising, after sending the refer message to the second mobile terminal, the steps of:
storing in the second mobile terminal, the double address comprising the service feature tag and the unique group identifier;
initially declining by the second mobile terminal, to join the conference service; and at a later time:
utilizing the unique group identifier by the second mobile terminal to join the group; and
utilizing the stored service feature tag by the second mobile terminal to subscribe to the conference service.

5. The method according to claim 1, wherein the step of utilizing the stored service feature tag by the second mobile terminal to subscribe to the conference service includes sending a subscribe message from the second mobile terminal to the focal point associated with the conference service, said subscribe message including the stored service feature tag.

6. An arrangement in a wireless communication network for providing users with control of service management, wherein each user is served by an associated Call State Control Function (CSCF) in the network, said arrangement comprising a Focal Point in communication with a Conference Factory and a Multimedia Resource Function Processor (MRFP), wherein the Focal Point and the Conference Factory are associated with an identified conference service, wherein the arrangement is configured to:
enable a first user to establish a group by sending a first Invite message from the first user to the network, the first Invite message identifying the conference service, thereby enabling the network to route the first Invite message to the Conference Factory for the identified conference service;
enable the first user to invite a plurality of other users defined by the first user to join the group and to subscribe to a conference service to be provided within the group, wherein invitations sent by the first user include a double address comprising a unique group identifier and a service feature tag identifying the conference service;
enable the first user to start the conference service within the group, wherein the arrangement is configured to ensure that the service does not conflict with any other services already running within the group or in other groups;
wherein to enable the first user to invite the plurality of other users defined by the first user to join the group, the arrangement includes a mobile terminal adapted to send a refer message to the plurality of other users defined by the first user, said refer message containing the double address comprising the unique group identifier and the service feature tag, wherein the service feature tag provides an address of the conference factory;
enable each of the other users to utilize the unique group identifier to join the group, wherein the Focal Point is configured to receive from each of the other users, a second Invite message including the unique group identifier; and
enable each of the other users to utilize the stored service feature tag to subscribe to the conference service.

7. A mobile terminal for providing a user with control of service management in a wireless communication network, wherein the mobile terminal is configured to:
initiate establishment of a group of mobile terminals by sending an Invite message from the mobile terminal to the network, the Invite message identifying a conference service, thereby enabling the network to route the Invite message to a conference factory for the identified conference service;
create a unique group identifier for the group;
send invitations to other mobile terminals not included in the group of mobile terminals to join the group, said invitations including a double address comprising the unique group identifier and a service feature tag identifying a conference service to be provided within the group, wherein the unique group identifier enables each of the other mobile terminals to join the group by sending a second Invite message including the unique group identifier to a focal point associated with the identified conference service, and to utilize the stored service feature tag to subscribe to the conference service;
store double addresses comprising unique group identifiers and service feature tags received in invitations from the other mobile terminals; and
send acceptances to invitations to join other groups received from the other mobile terminals.

8. The mobile terminal according to claim 7, wherein the mobile terminal is also configured to send rejections to invitations to join other groups received from the other mobile terminals.

9. The mobile terminal according to claim 8, wherein the mobile terminal is also configured to leave a group previously joined.

* * * * *